(12) United States Patent
Jang et al.

(10) Patent No.: US 12,471,631 B2  
(45) Date of Patent: Nov. 18, 2025

(54) VAPORIZER AND AEROSOL GENERATION DEVICE INCLUDING THE SAME

(71) Applicant: KT&G CORPORATION, Daejeon (KR)

(72) Inventors: Chul Ho Jang, Daejeon (KR); Jong Seong Jeong, Daejeon (KR); Gyoung Min Go, Daejeon (KR); Hyung Jin Bae, Daejeon (KR); Jang Won Seo, Daejeon (KR); Min Seok Jeong, Daejeon (KR); Jin Chul Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 699 days.

(21) Appl. No.: 17/296,837

(22) PCT Filed: Dec. 21, 2020

(86) PCT No.: PCT/KR2020/018745  
§ 371 (c)(1),  
(2) Date: May 25, 2021

(87) PCT Pub. No.: WO2021/153907  
PCT Pub. Date: Aug. 5, 2021

(65) Prior Publication Data  
US 2022/0110367 A1  Apr. 14, 2022

(30) Foreign Application Priority Data  
Jan. 31, 2020  (KR) .................. 10-2020-0011900

(51) Int. Cl.  
*A24F 40/46* (2020.01)  
*A24F 40/10* (2020.01)  
(Continued)

(52) U.S. Cl.  
CPC .............. *A24F 40/46* (2020.01); *A24F 40/10* (2020.01); *A24F 40/44* (2020.01); *A24F 40/48* (2020.01); *H05B 3/22* (2013.01)

(58) Field of Classification Search  
None  
See application file for complete search history.

(56) References Cited

U.S. PATENT DOCUMENTS

2018/0184712 A1  7/2018 Fraser et al.  
2018/0310616 A1* 11/2018 Clemens .............. H05B 1/0244  
(Continued)

FOREIGN PATENT DOCUMENTS

CN   108185536 A    6/2018  
DE   102017123870 A1  4/2019  
(Continued)

OTHER PUBLICATIONS

Saman Beyhaghi, Sandrine Geoffroy, Marc Prat, Krishna M. Pillai, "Wicking and Evaporation of Liquids in Porous Wicks: A Simple Analytical Approach to Optimization of Wick Design" AIChE, Feb. 12, 2014 (Year: 2014).*

(Continued)

*Primary Examiner* — Philip Y Louie  
*Assistant Examiner* — Virginia R Bieger  
(74) *Attorney, Agent, or Firm* — Sughrue Mion, PLLC

(57) ABSTRACT

Provided herein are a vaporizer and an aerosol generation device including the same. The vaporizer according to some embodiments of the present disclosure includes a porous wick configured to absorb an aerosol-generating substrate in a liquid state through a porous body, and a heating element which includes a heating pattern having a planar form that is embedded in the porous body and which is configured to heat the absorbed aerosol-generating substrate by the heating pattern to generate an aerosol. Since the heating pattern (Continued)

is embedded at a predetermined depth from a surface of the porous body, the amount of generated aerosol may be increased, and the risk of damage to the wick and the carbonization phenomenon may be reduced.

9 Claims, 9 Drawing Sheets

(51) Int. Cl.
    *A24F 40/44*     (2020.01)
    *A24F 40/48*     (2020.01)
    *H05B 3/22*     (2006.01)

(56) References Cited

U.S. PATENT DOCUMENTS

| | | | |
|---|---|---|---|
| 2019/0133186 A1* | 5/2019 | Fraser | A24F 40/44 |
| 2019/0246692 A1* | 8/2019 | Li | C04B 35/00 |
| 2019/0350256 A1 | 11/2019 | Hejazi | |
| 2019/0373953 A1* | 12/2019 | Atkins | A24F 40/485 |

FOREIGN PATENT DOCUMENTS

| | | |
|---|---|---|
| EP | 3104724 B1 | 3/2019 |
| KR | 10-2019-0034198 A | 4/2019 |
| KR | 10-2019-0120310 A | 10/2019 |
| WO | 2017/001820 A1 | 1/2017 |
| WO | 2019/157647 A1 | 8/2019 |
| WO | 2019/206900 A1 | 10/2019 |
| WO | 2019/206985 A1 | 10/2019 |

OTHER PUBLICATIONS

Supplementary European Search Report issued Jan. 31, 2022 in European Application No. 20875663.5.
Office Action dated Mar. 23, 2023 from the Chinese Patent Office in Application No. 202080006045.3.
International Search Report of PCT/KR2020/018745 dated Apr. 8, 2021 [PCT/ISA/210].

* cited by examiner

[FIG. 1]
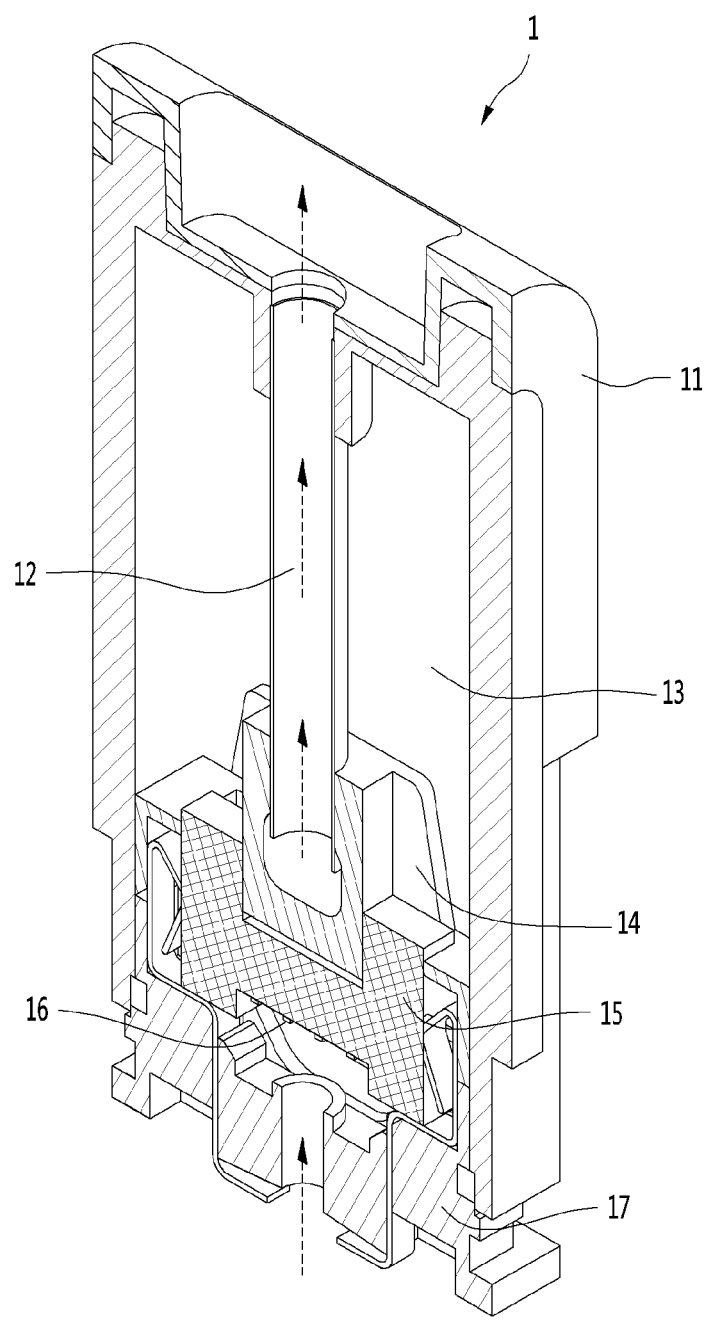

[FIG. 2]
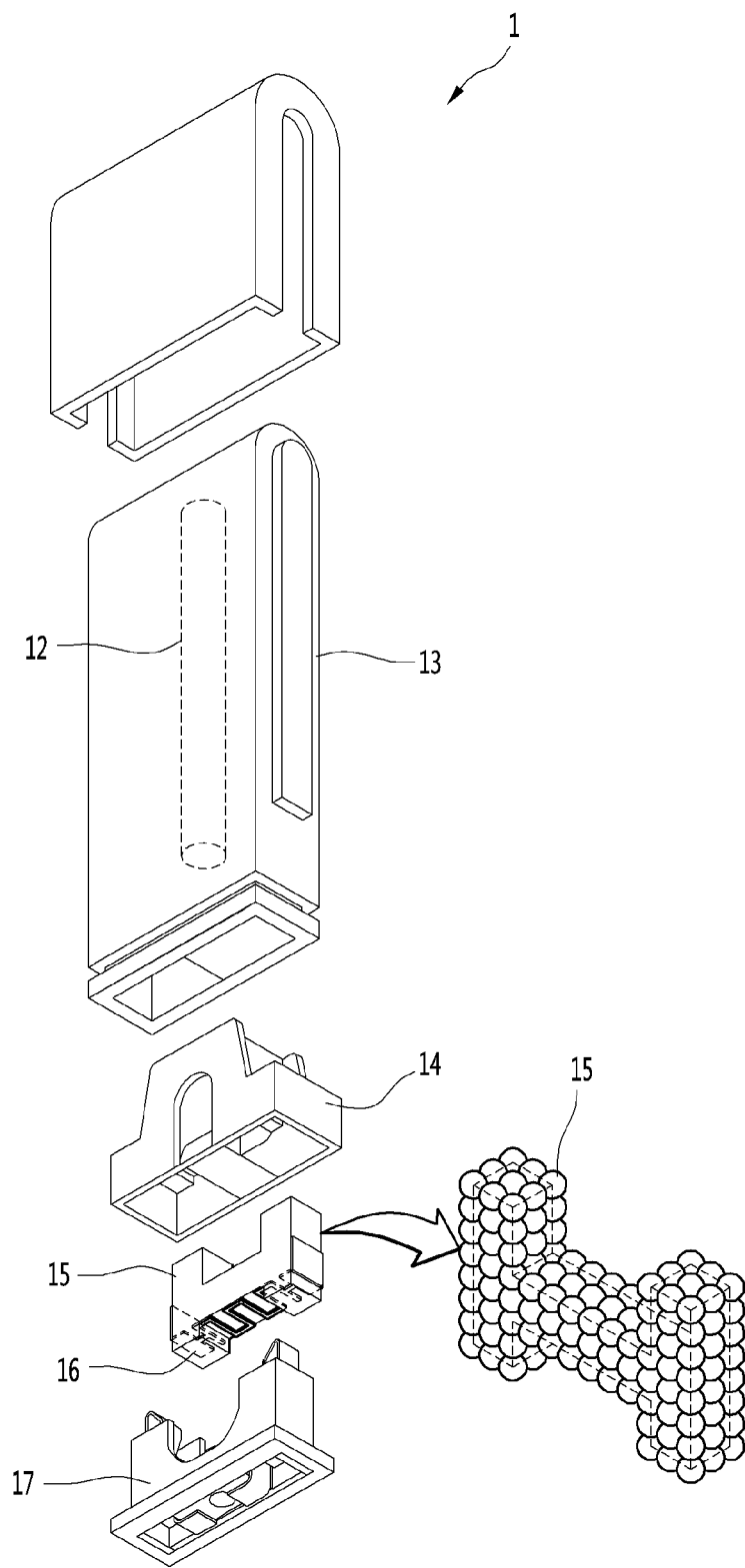

[FIG. 3]
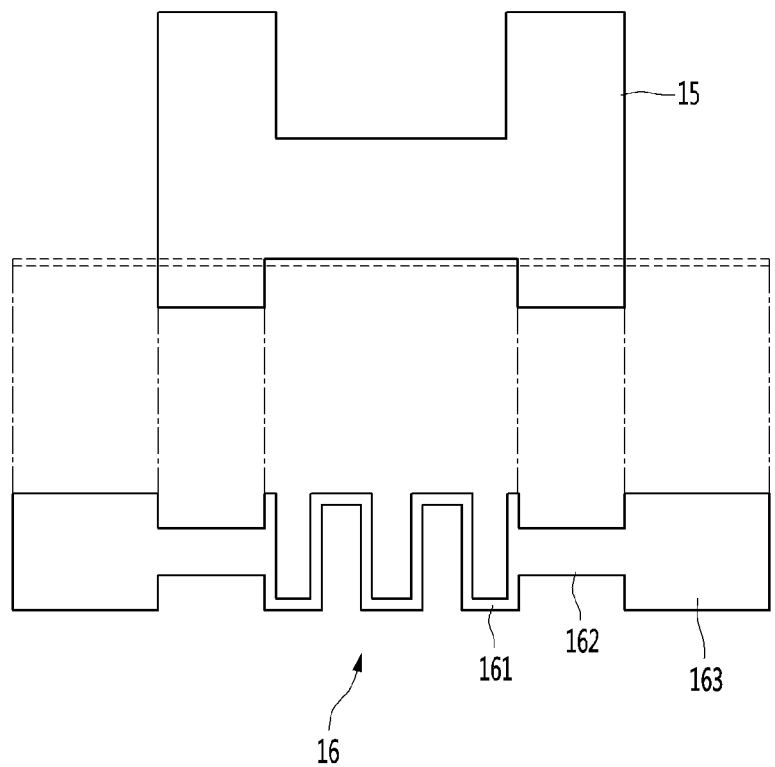
[FIG. 4]
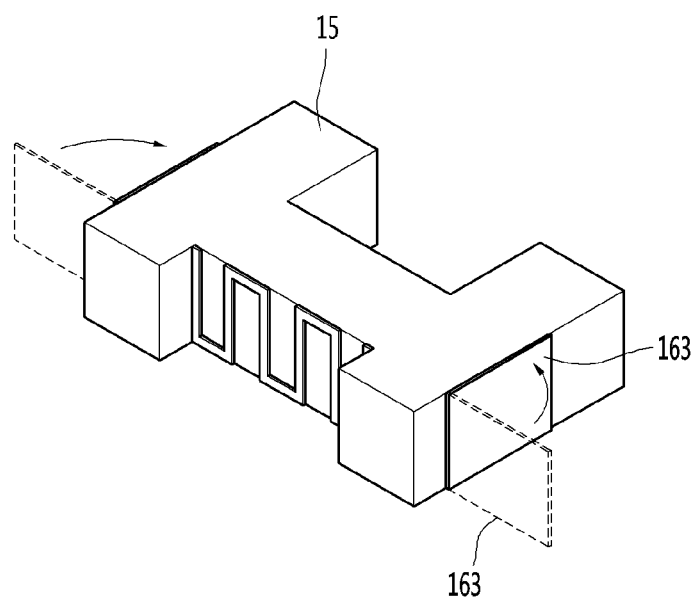

[FIG. 5]
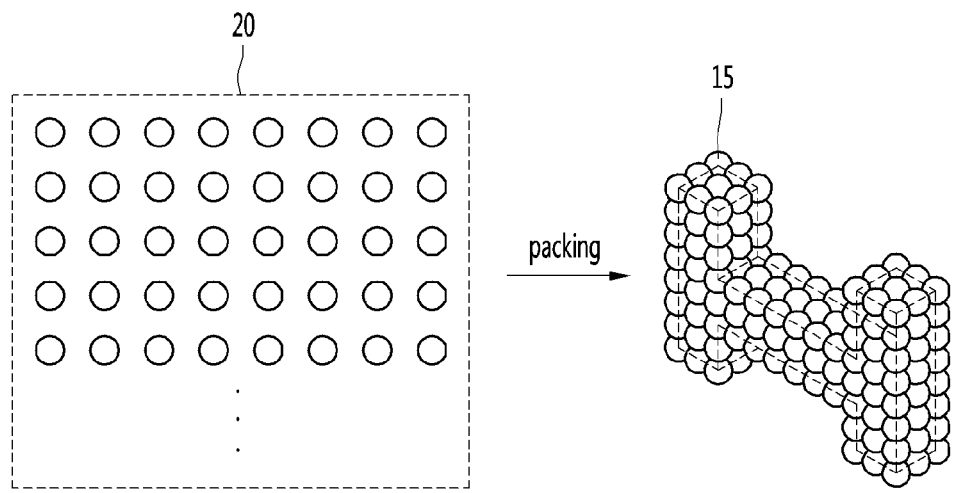
[FIG. 6]
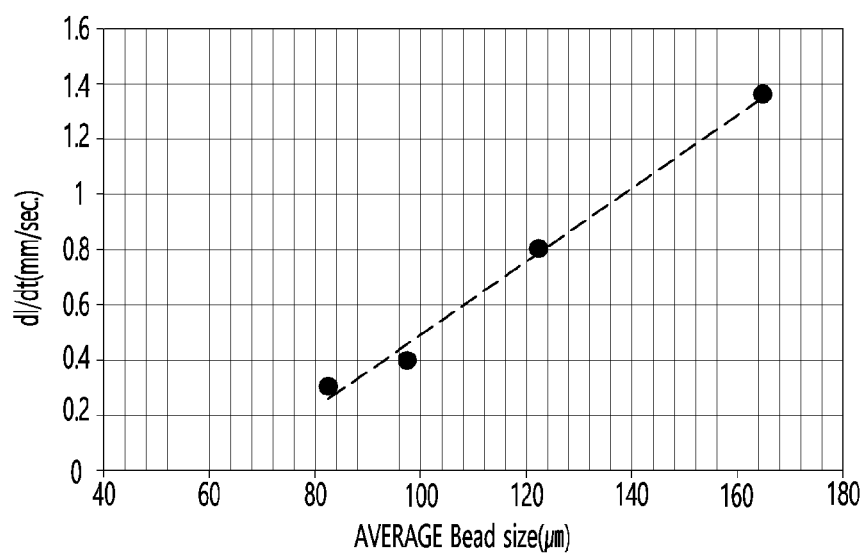

[FIG. 7]
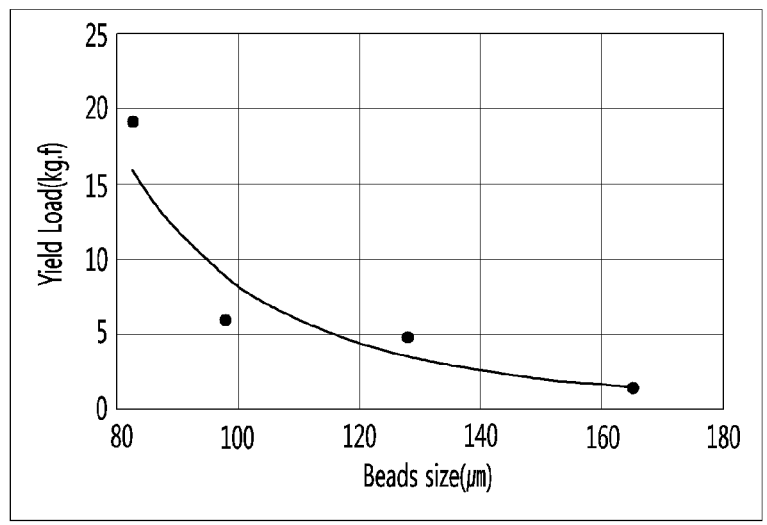
[FIG. 8]
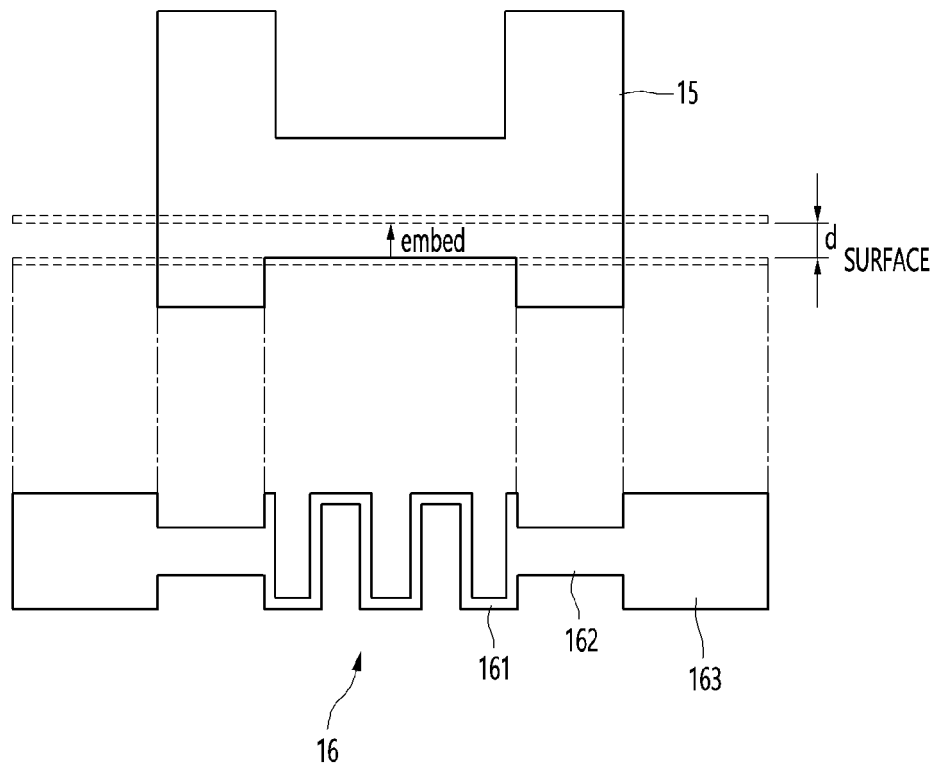

[FIG. 9]
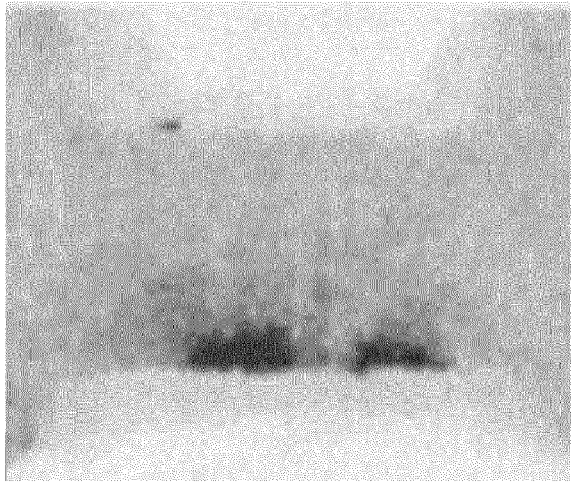
[FIG. 10]
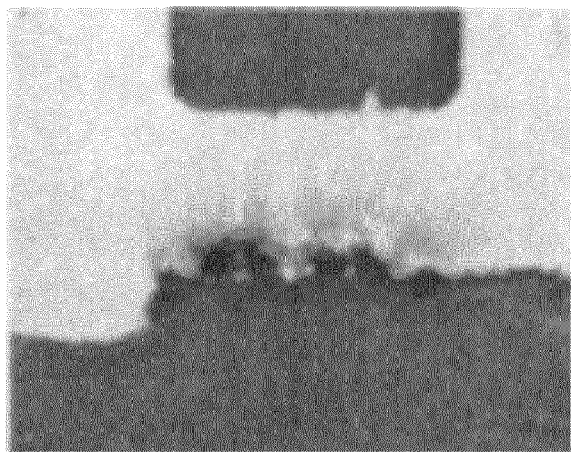
[FIG. 11]
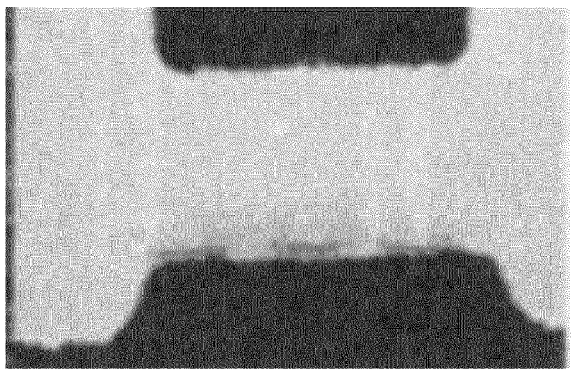

[FIG. 12]
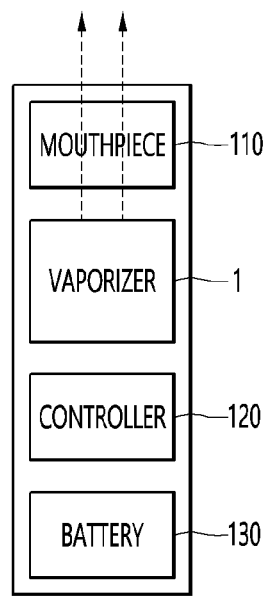

[FIG. 13]
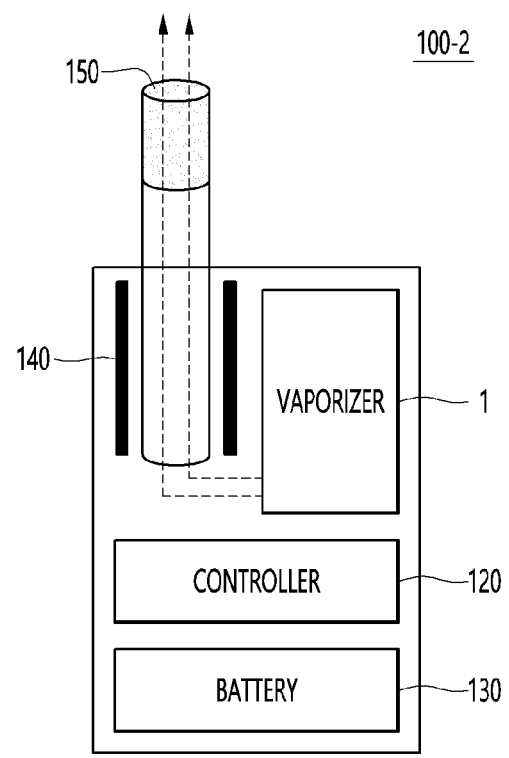

[FIG. 14]
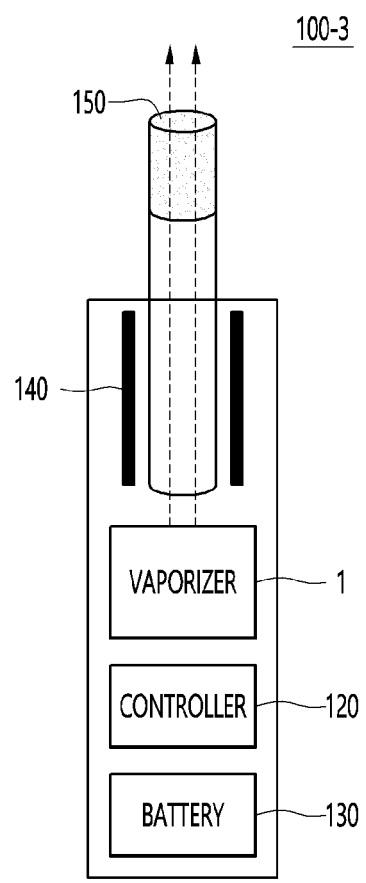

VAPORIZER AND AEROSOL GENERATION DEVICE INCLUDING THE SAME

CROSS REFERENCE TO RELATED APPLICATIONS

This application is a National Stage of International Application No. PCT/KR2020/018745, filed Dec. 21, 2020, claiming priority to Korean Patent Application No. 10-2020-0011900, filed Jan. 31, 2020.

TECHNICAL FIELD

The present disclosure relates to a vaporizer and an aerosol generation device including the same, and more particularly, to a combination structure of a wick and a heating element that is able to increase an amount of generated aerosol and reduce the risk of damage to the wick and to a vaporizer and aerosol generation device having the combination structure.

BACKGROUND ART

In recent years, demand for alternative smoking articles that overcome disadvantages of general cigarettes has increased. For example, instead of cigarettes, demand for aerosol generation devices that vaporize liquid compositions to generate an aerosol has increased, and accordingly, active research has been carried out on liquid vaporization-type aerosol generation devices.

In the liquid vaporization-type aerosol generation device, a wick and a heating element are the key components of the device for vaporizing a liquid composition to generate an aerosol. Here, the amount of generated aerosol and the risk of damage to the wick may vary according to the combination structure of the wick and the heating element. Accordingly, finding the optimal combination structure of the wick and the heating element is one of the important research tasks in the art.

Disclosure

Technical Problem

Some embodiments of the present disclosure are directed to providing an optimal combination structure of a wick and a heating element that is able to increase an amount of generated aerosol and reduce the risk of damage to the wick.

Some embodiments of the present disclosure are also directed to providing a vaporizer and aerosol generation device to which the optimal combination structure of the wick and the heating element is applied.

Some embodiments of the present disclosure are also directed to providing a vaporizer, which is capable of guaranteeing uniformity in liquid transport speed and amount of transported liquid, and an aerosol generation device including the same.

Objectives of the present disclosure are not limited to the above-mentioned objectives, and other unmentioned objectives should be clearly understood by those of ordinary skill in the art to which the present disclosure pertains from the description below.

Technical Solution

A vaporizer according to some embodiments of the present disclosure includes a porous wick configured to absorb an aerosol-generating substrate in a liquid state through a porous body, and a heating element comprising a heating pattern which has a planar form and is embedded in the porous body, and configured to heat the absorbed aerosol-generating substrate by the heating pattern to generate an aerosol.

In some embodiments, the heating pattern may be embedded at a position deviated in a specific direction from a center of the porous body.

In some embodiments, a depth at which the heating pattern is embedded may be in a range of 0 μm to 400 μm from a surface of the porous body.

In some embodiments, the heating element may further include one or more terminals electrically connected to the heating pattern and a battery, and the one or more terminals may be disposed to come in close contact with a side surface of the porous body.

In some embodiments, the porous body may be formed by a plurality of beads. Here, the beads may be ceramic beads, and a diameter of each of the beads may be in a range of 70 μm to 100 μm.

In some embodiments, the vaporizer may further include an airflow tube disposed in a direction upward from the porous wick and configured to deliver the generated aerosol, and the heating pattern may be embedded in a lower portion of the porous body.

Advantageous Effects

According to various embodiments of the present disclosure, a heating element can be embedded at a depth in a range of 0 μm to 400 μm from a surface of a body of a porous wick. In this way, an amount of generated aerosol can be increased and the risk of damage to the porous wick can be reduced.

Also, the body of the porous wick can be implemented with an assembly of a plurality of beads. Since the size and distribution of pores can be uniform in the porous body implemented with the bead assembly, the manufactured porous wick can guarantee uniformity in the liquid transport speed and the amount of transported liquid.

In addition, a terminal electrically connected to a heating pattern can be disposed to come in close contact with both side surfaces of the body of the porous wick. Accordingly, a space that the heating element occupies can be reduced, and thus a vaporizer or an aerosol generation device can be manufactured in a more compact form. Further, a problem in which the terminal interferes with an air flow and causes a decrease in the amount of generated aerosol can be addressed.

The advantageous effects according to the technical idea of the present disclosure are not limited to the above-mentioned advantageous effects, and other unmentioned advantageous effects should be clearly understood by those of ordinary skill in the art from the description below.

DESCRIPTION OF DRAWINGS

FIG. 1 is an exemplary configuration diagram of a vaporizer according to some embodiments of the present disclosure.

FIG. 2 is an exemplary exploded view of the vaporizer according to some embodiments of the present disclosure.

FIGS. 3 and 4 are views for describing a detailed configuration and an arrangement form of a heating element according to some embodiments of the present disclosure.

FIG. 5 illustrates a process of manufacturing a porous wick according to some embodiments of the present disclosure.

FIG. 6 illustrates experimental results relating to a bead size and a liquid transport speed of the porous wick.

FIG. 7 illustrates experimental results relating to a bead size and a strength of the porous wick.

FIG. 8 is a view for describing a combination structure of the porous wick and the heating element according to some embodiments of the present disclosure.

FIGS. 9 to 11 illustrate experimental results according to the combination structure of the porous wick and the heating element.

FIGS. 12 to 14 are exemplary block diagrams illustrating an aerosol generation device to which the vaporizer according to some embodiments of the present disclosure is applicable.

MODES OF THE INVENTION

Hereinafter, exemplary embodiments of the present disclosure will be described in detail with reference to the accompanying drawings. Advantages and features of the present disclosure and a method of achieving the same should become clear with embodiments described in detail below with reference to the accompanying drawings. However, the technical idea of the present disclosure is not limited to the following embodiments and may be implemented in various other forms. The embodiments make the technical idea of the present disclosure complete and are provided to completely inform those of ordinary skill in the art to which the present disclosure pertains of the scope of the present disclosure. The technical idea of the present disclosure is defined only by the scope of the claims.

In assigning reference numerals to components of each drawing, it should be noted that the same reference numerals are assigned to the same components as much as possible even when the components are illustrated in different drawings. Also, in describing the present disclosure, when detailed description of a known related configuration or function is deemed as having the possibility of obscuring the gist of the present disclosure, the detailed description thereof will be omitted.

Unless otherwise defined, all terms including technical or scientific terms used herein have the same meaning as commonly understood by those of ordinary skill in the art to which the present disclosure pertains. Terms defined in commonly used dictionaries should not be construed in an idealized or overly formal sense unless expressly so defined herein. Terms used herein are for describing the embodiments and are not intended to limit the present disclosure. In the specification, a singular expression includes a plural expression unless the context clearly indicates otherwise.

Also, in describing components of the present disclosure, terms such as first, second, A, B, (a), and (b) may be used. Such terms are only used for distinguishing one component from another component, and the essence, order, sequence, or the like of the corresponding component is not limited by the terms. In a case in which a certain component is described as being "connected," "coupled," or "linked" to another component, it should be understood that, although the component may be directly connected or linked to the other component, still another component may also be "connected," "coupled," or "linked" between the two components.

The terms "comprises" and/or "comprising" used herein do not preclude the presence of or the possibility of adding one or more components, steps, operations, and/or devices other than those mentioned.

Prior to the description of various embodiments of the present disclosure, some terms used herein will be clarified.

In the present specification, "aerosol-generating substrate" may refer to a material that is able to generate an aerosol. The aerosol may include a volatile compound. The aerosol-generating substrate may be a solid or liquid.

For example, solid aerosol-generating substrates may include solid materials based on tobacco raw materials such as reconstituted tobacco leaves, shredded tobacco, and reconstituted tobacco, and aerosol-generating substrates in a liquid state may include liquid compositions based on nicotine, tobacco extracts, and/or various flavoring agents. However, the scope of the present disclosure is not limited to the above-listed examples.

As a more specific example, the aerosol-generating substrates in a liquid state may include at least one of propylene glycol (PG) and glycerin (GLY) and may further include at least one of ethylene glycol, dipropylene glycol, diethylene glycol, triethylene glycol, tetraethylene glycol, and oleyl alcohol. As another example, the aerosol-generating substrate may further include at least one of nicotine, moisture, and a flavoring material. As still another example, the aerosol-generating substrate may further include various additives such as cinnamon and capsaicin. The aerosol-generating substrate may not only include a liquid material with high fluidity but also include a material in the form of gel or a solid. In this way, as the components constituting the aerosol-generating substrate, various materials may be selected according to embodiments, and composition ratios thereof may also vary according to embodiments. In the following description, "liquid" may be understood as referring to the aerosol-generating substrate in a liquid state.

In the specification, "aerosol generation device" may refer to a device that generates an aerosol using an aerosol-generating substrate in order to generate an aerosol that can be inhaled directly into the user's lungs through the user's mouth. Examples of the aerosol generation device may include a liquid-type aerosol generation device using a vaporizer and a hybrid-type aerosol generation device using a vaporizer and a cigarette together. However, the examples of the aerosol generation device may further include various other kinds of aerosol generation devices, and the scope of the present disclosure is not limited to the above-listed examples. Some examples of the aerosol generation device will be described below with reference to FIGS. 12 to 14.

In the specification, "puff" refers to inhalation by a user, and the inhalation may refer to a situation in which a user draws in smoke into his or her oral cavity, nasal cavity, or lungs through the mouth or nose.

Hereinafter, various embodiments of the present disclosure will be described in detail with reference to the accompanying drawings.

FIG. 1 is an exemplary configuration diagram of a vaporizer 1 according to some embodiments of the present disclosure, and FIG. 2 is an exemplary exploded view of the vaporizer 1. In FIG. 1, dotted arrows represent a delivery path of air or an aerosol.

As illustrated in FIGS. 1 and 2, the vaporizer 1 may include an upper case 11, an airflow tube 12, a liquid reservoir 13, a wick housing 14, a porous wick 15, a heating element 16, and a lower case 17. However, only some components relating to the present embodiment are illustrated in FIG. 1. Therefore, those of ordinary skill in the art to which the present disclosure pertains should understand that the vaporizer 1 may further include general-purpose components other than the components illustrated in FIG. 1.

Also, not all the components 11 to 17 illustrated in FIG. 1 may be essential to the vaporizer 1. That is, in some other embodiments of the present disclosure, at least some of the components illustrated in FIG. 1 may be omitted or replaced with other components. Hereinafter, each component of the vaporizer 1 will be described.

The upper case 11 may serve as a cover or housing for an upper portion of the vaporizer 1. In some embodiments, the upper case 11 may also serve as a mouthpiece.

Next, the airflow tube 12 may serve as an airflow path for air and/or an aerosol. For example, an aerosol generated by the heating element 16 may be discharged in a direction toward the upper case through the airflow tube 12 and inhaled by the user. Although FIG. 1 illustrate that inhalation by the user is performed in a direction toward an upper end of the vaporizer 1, the shape of the airflow tube 12 and the delivery path may be changed according to the design of the aerosol generation device and/or the airflow tube 12.

Next, the liquid reservoir 13 may have a predetermined space where the aerosol-generating substrate in a liquid state may be stored. Also, the liquid reservoir 13 may supply the stored aerosol-generating substrate to the heating element 16 through the porous wick 15.

Next, the wick housing 14 may refer to a housing that is disposed between the liquid reservoir 13 and the porous wick 15 and surrounds at least a portion of the porous wick 15.

Next, the porous wick 15 may absorb the aerosol-generating substrate stored in the liquid reservoir 13 through a porous body and deliver the aerosol-generating substrate to the heating element 16. Although FIGS. 1 and 2 illustrate an example in which the porous wick 15 has an H-shaped body, the porous wick 15 may be designed and implemented in various other shapes.

In some embodiments, as illustrated in FIG. 2, a body of the porous wick 15 may be formed by a plurality of beads. Since the size and distribution of pores may be uniform in the porous body implemented with the bead assembly, the uniformity in the liquid transport speed and the amount of transported liquid may be guaranteed. The present embodiment will be described in more detail below with reference to FIGS. 5 to 7.

Next, the heating element 16 may heat the liquid absorbed into the porous wick 15 to generate an aerosol.

In some embodiments, the heating element 16 may include a heating pattern having a planar form and a terminal configured to receive electricity from a battery (not illustrated) (see FIG. 2 or 3). The heating pattern may be attached to or embedded in a lower portion of the body of the porous wick 15 and heat the absorbed liquid using a bottom heating method. In such a case, since the heating element 16 may evenly heat the liquid absorbed into the porous wick 15, the amount of generated aerosol (that is, vapor production) may be significantly increased. The aerosol generated by heating may be inhaled by the user through the airflow tube 12 disposed above the porous wick 15.

In some embodiments, as illustrated in FIG. 3, the heating element 16 may include a heating pattern 161 having a planar form, a terminal 163 configured to receive electricity from a battery (not illustrated), and a connecting member 162 that connects the heating pattern 161 and the terminal 163 to each other. The connecting member 162 may also serve to fix the heating element 16 to the body of the porous wick 15. As such, it is possible to address a problem in which the heating element 16 attached to (or embedded in) the porous wick 15 is detached due to reasons such as damage to the wick or weakening of adhesion.

Also, in some embodiments, the terminal 163 may be disposed to come in close contact with both side surfaces of the body of the porous wick 15. For example, as illustrated in FIG. 4, the terminal 163 protruding from both side surfaces of the body of the porous wick 15 may be folded to come in close contact with the side surfaces. In such a case, since the space that the heating element occupies is reduced, the vaporizer 1 may be manufactured in a more compact form. Further, a problem in which the terminal 163 interferes with an air flow and causes a decrease in the amount of generated aerosol may be alleviated. For example, in a case in which the terminal protrudes downward (that is, toward the lower case 17), the protruding terminal may interfere with an inflow of air through an air hole of the lower case, but such a problem may be prevented.

Also, in some embodiments, the heating pattern 161 may be embedded in the body of the porous wick 15. For example, the heating pattern 161 may be embedded at a predetermined distance or depth from a surface of the porous body. An in-mold forming technique may be utilized to embed the heating pattern 161, but the scope of the present disclosure is not limited thereto. The present embodiment will be described in more detail below with reference to FIGS. 8 to 11.

The description of the components of the vaporizer 1 will be continued by referring back to FIGS. 1 and 2.

The lower case 17 is a housing disposed at a lower portion of the vaporizer 1 and may serve to support the lower portion of the vaporizer 1, the porous wick 15, the heating element 16, and the like.

In some embodiments, an air hole or an airflow tube may be included in the lower case 17 to allow air to smoothly enter the heating element 16 (see FIG. 1).

Also, in some embodiments, a connection terminal configured to electrically connect the terminal of the heating element 16 to the battery (not illustrated) may be included in the lower case 17 (see FIG. 1).

The vaporizer 1 according to some embodiments of the present disclosure has been described above with reference to FIGS. 1 to 4. Hereinafter, a porous wick 15 made of a bead assembly according to some embodiments of the present disclosure will be described with reference to FIGS. 5 to 7.

FIG. 5 illustrates a process of manufacturing the porous wick 15.

As illustrated in FIG. 5, a plurality of beads 20 may be packed to manufacture the porous wick 15. For example, the plurality of beads 20 may be sphere-packed and fired to form a body of the porous wick 15. Examples of a bead packing structure may include a body-centered cubic (BCC) structure, a face-centered cubic (FCC) structure, and the like. However, various other packing structures may be utilized, and thus the scope of the present disclosure is not limited thereto. Since the BCC and FCC structures are widely known sphere packing structures in the art, description thereof will be omitted.

In a case in which the porous wick 15 is manufactured using a bead assembly, the porosity, pore size, pore distribution, and the like may be easily controlled by changing the bead size, packing method, and/or packing structure. For example, the porous wick 15 in which the porosity is higher than or equal to a reference value and pore distribution is uniform may be easily manufactured, such that the manufactured porous wick may guarantee uniformity in the liquid transport speed and the amount of transported liquid.

The beads for the porous wick 15 may be made of various materials. For example, the beads may be made of a ceramic, and ceramic beads may include glass ceramic beads or alumina ceramic beads. However, beads made of various other materials may be utilized, and thus the scope of the present disclosure is not limited to the above-listed examples.

Meanwhile, since the bead size (e.g., diameter) is associated with the liquid transport speed and the strength of the wick, it may be important to appropriately determine the bead size. For example, as in the experimental results shown in FIGS. 6 and 7, as the bead diameter increases, the liquid transport speed of the wick increases whereas the strength of the wick decreases. This is because, as the bead diameter increases, the pore size increases while the number of beads per unit volume decreases, causing the number of contact interfaces during sintering to decrease. Therefore, in order to achieve both the proper strength and proper liquid transport speed of the wick, it may be important to appropriately determine the bead size.

In some embodiments, the bead diameter may be in a range of 10 μm to 300 μm. Preferably, the bead diameter may be in a range of 30 μm to 270 μm or 50 μm to 250 μm. More preferably, the bead diameter may be in a range of 60 μm to 100 μm, 65 μm to 90 μm, 70 μm to 95 μm, 75 μm to 90 μm, 80 μm to 95 μm, 75 μm to 85 μm, or 75 μm to 80 μm. Within such numerical ranges, a porous wick having an appropriate strength may be manufactured, and the liquid transport speed of the porous wick may also be improved as compared to a wick made of a fiber bundle.

Also, in some embodiments, the diameter distribution of the plurality of beads forming the porous wick 15 may have a tolerance that is 30% of an average diameter. Preferably, the diameter distribution of the plurality of beads may have a tolerance that is 25%, 23%, or 21%. More preferably, the diameter distribution of the plurality of beads may have a tolerance that is 20%, 18%, 16%, 14%, 12%, or 10%. Still more preferably, the diameter distribution of the plurality of beads may have a tolerance that is 8%, 6%, or 5%. Since it is not easy to continuously manufacture beads having the same diameter, the cost required to manufacture the porous wick 15 and the level of difficulty of manufacture may be significantly reduced by allowing the above tolerances. Furthermore, in a case in which the plurality of beads having the above tolerances are packed to manufacture the porous wick, a contact area between the beads increases, and thus the strength of the wick may also be improved.

In addition, the bead size and/or bead packing structure may be determined also on the basis of viscosity of a target aerosol-generating substrate. This is because, in order to guarantee a proper liquid transport speed for an aerosol-generating substrate having a high viscosity, there is a need to increase the porosity of the wick. Here, the target aerosol-generating substrate may refer to a substrate to be stored in a liquid reservoir. In some embodiments, a tolerance of the bead size may also be adjusted on the basis of the viscosity of the target aerosol-generating substrate. For example, in a case in which the viscosity of the target aerosol-generating substrate is higher than or equal to a reference value, the tolerance of the bead size may be adjusted to a smaller value. This is because, when the tolerance of the bead size becomes smaller, the pore size increases and thus the liquid transport speed may increase. In the opposite case, the tolerance of the bead size may be adjusted to a greater value.

In a case in which the porous wick 15 is implemented using the bead assembly, the following various advantages may be obtained.

The first advantage is that the porous wick in which the pore size and pore distribution are uniform may be easily manufactured and the variation in the quality of the wick may be minimized. Also, since the porous wick is able to guarantee uniformity in the liquid transport speed and the amount of transported liquid, a burnt taste and damage to a wick may also be minimized.

The second advantage is that physical characteristics (e.g., porosity, pore size, pore distribution, strength) of the porous wick may be easily controlled. This means that the liquid transport ability of the wick may be controlled, because the physical characteristics of the porous wick are closely associated with the liquid transport ability (e.g., transport speed, transport amount). For example, controllable factors such as the bead size, bead packing method, and/or bead packing structure may be adjusted to control the liquid transport ability of the porous wick.

Meanwhile, the vapor production (that is, amount of generated aerosol) of the aerosol generation device depends on performance (e.g., heat amount) of the heating element and the liquid transport ability of the wick. Even if the performance of the heating element is excellent, the liquid may burn out due to instantaneous liquid depletion when the liquid transport ability of the wick is poor. Also, in a case in which the liquid transport ability of the wick is superior to the performance of the heating element, a liquid that did not vaporize may remain on the surface of the wick and cause a leakage of the liquid. Therefore, it is important that the liquid transport ability of the wick and the performance of the heating element are controlled to be balanced, but while it is easy to control the performance of the heating element, it is not easy to control the liquid transport ability of the wick. In this respect, the porous wick implemented using the bead assembly may improve the vapor production most effectively, because the liquid transport ability can be easily controlled.

The porous wick 15 made of the bead assembly according to some embodiments of the present disclosure has been described above with reference to FIGS. 5 to 7. Hereinafter, a combination structure of the porous wick 15 and the heating element 16 will be described with reference to FIGS. 8 to 11.

FIG. 8 illustrates the combination structure of the porous wick 15 and the heating element 16 according to some embodiments of the present disclosure. Although FIG. 8 illustrates that the heating element 16 consists of the heating pattern 161, the connecting member 162, and the terminal 163, this is merely to provide convenience of understanding, and the heating element 16 may also be implemented in other forms.

As illustrated in FIG. 8, the heating element 16 (i.e., the heating pattern 161 and the connecting member 162) may be embedded at a predetermined depth d from a surface of the body of the porous wick 15. Although FIG. 8 illustrates an example in which the heating element 16 is embedded in a lower portion of the body of the porous wick 15, this may vary according to the structure, heating method, and the like of the vaporizer 1.

In some embodiments, the heating element 16 may be embedded at a position that is deviated in a specific direction from the center of the body of the porous wick 15. For example, as illustrated in FIG. 1 or 2, when the liquid reservoir 13 or the airflow tube 12 is disposed above the porous wick 15, the heating element 16 may be embedded at a position deviated from the center of the body of the porous wick 15 in the opposite direction (e.g., downward from the porous wick 15 in FIG. 1). In such a case, since the porous wick 15 may be heated when the liquid is sufficiently absorbed, the amount of generated aerosol may be significantly increased.

Meanwhile, since the amount of generated aerosol and the risk of damage to the wick vary according to the embedding depth d, it may be important to appropriately determine the embedding depth d. For example, as can be seen from the experimental results below, the closer the embedded heating element 16 is to the surface of the porous wick 15, there may be a larger amount of generated aerosol, but the risk of damage to the porous wick 15 may also increase.

In some embodiments, the embedding depth d may be in a range of 0 μm to 400 μm. Preferably, the embedding depth d may be in a range of 50 μm to 400 μm, 0 μm to 350 μm, 50 μm to 350 μm, or 0 μm to 300 μm. Alternatively, preferably, the embedding depth d may be in a range of 100 μm to 300 μm, 100 μm to 250 μm, 150 μm to 350 μm, 150 μm to 300 μm, or 150 μm to 250 μm. These numerical ranges are obtained from the experimental results which will be described below. It was confirmed that, when the heating pattern 161 and the porous wick 15 are combined within these numerical ranges, a sufficient amount of aerosol is generated and the risk of damage to the wick is reduced.

Hereinafter, the numerical ranges of the embedding depth d and effects according thereto will be further described through experimental examples. However, the following examples are merely some of various examples, and thus the scope of the present disclosure is not limited thereto.

The configurations of examples relating to the porous wick 15 and the heating element 16 are as shown in Table 1 below, and experimental results relating to the amount of generated aerosol and the degree of wick damage are shown in Table 2 and FIGS. 9 to 11. FIGS. 9, 10, and 11 show the cases in which the embedding depth d is 0 μm, 200 μm, and 400 μm, respectively, and illustrate a state of the wick after 2,000 puffs are performed.

TABLE 1

| Classification | Bead size (μm) | Embedding depth (μm) | Material |
|---|---|---|---|
| Example 1 | 75~90 | Attached to surface | Ceramic glass |
| Example 2 | 75~90 | 0 | Ceramic glass |
| Example 3 | 75~90 | 200 | Ceramic glass |
| Example 4 | 75~90 | 400 | Ceramic glass |
| Example 5 | 75~90 | 600 | Ceramic glass |

TABLE 2

| Classification | Amount of generated aerosol | Degree of wick damage | Remarks |
|---|---|---|---|
| Example 1 | Extremely large | Severe | Heating pattern was detached, carbonization of liquid occurred |
| Example 2 | Large | Moderate | See FIG. 9 |
| Example 3 | Large | Moderate | See FIG. 10 |
| Example 4 | Moderate | Slight | See FIG. 11 |
| Example 5 | Small | Slight | Slight carbonization of liquid occurred |

As shown in Table 2 and FIGS. 9 to 11, it can be seen that the closer the heating element 16 was to the surface of the body of the porous wick 15, the larger the amount of generated aerosol was, but the risk of damage to the porous wick 15 also increased. In particular, in the case in which the heating element 16 was attached to the surface of the porous wick 15 (that is, completely exposed on the surface) according to Example 1, the heating element 16 was detached from the porous wick 15, and carbonization of the liquid also occurred. This is because adhesion between the porous wick 15 and the heating element 16 weakened due to thermal contraction/expansion of the heating element 16. It was confirmed that, at a point in time at which the adhesion weakened, the heating pattern was overheated and thus the carbonization of the liquid occurred.

Also, it can be seen that the deeper the heating element 16 was embedded in the body of the porous wick 15, the smaller the amount of generated aerosol was. This is because the deeper the heating element 16 is embedded, the larger the quantity of heat required to heat surrounding portions of the porous wick 15. Further, it was confirmed that, as the amount of generated aerosol decreased, the liquid transport was not smoothly performed, and thus the carbonization of the liquid occurred (refer to Example 5).

The combination structure of the porous wick 15 and the heating element 16 has been described above with reference to FIGS. 8 to 11. Hereinafter, aerosol generation devices 100-1 to 100-3 to which the vaporizer 1 according to an embodiment may be applied will be described with reference to FIGS. 12 to 14.

FIGS. 12 to 14 are exemplary block diagrams illustrating the aerosol generation devices 100-1 to 100-3. Specifically, FIG. 12 illustrates a liquid-type aerosol generation device 100-1, and FIGS. 13 and 14 illustrate hybrid-type aerosol generation devices 100-2 and 100-3 that use a liquid and a cigarette together.

As illustrated in FIG. 12, the aerosol generation device 100-1 may include a mouthpiece 110, the vaporizer 1, a battery 130, and a controller 120. However, this is merely a preferred embodiment for achieving the objectives of the present disclosure, and of course, some components may be added or omitted as necessary. Also, the components of the aerosol generation device 100-1 illustrated in FIG. 12 represent functional components that are functionally distinct, and the plurality of components may be implemented to be integrated with each other in an actual physical environment, or a single component may be implemented to be divided into a plurality of specific functional components. Hereinafter, each component of the aerosol generation device 100-1 will be described.

The mouthpiece 110 may be disposed at one end of the aerosol generation device 100-1 and come in contact with an oral region of a user so that the user may inhale an aerosol generated from the vaporizer 1. In some embodiments, the mouthpiece 110 may be a component of the vaporizer 1.

Next, the vaporizer 1 may vaporize an aerosol-generating substrate in a liquid state to generate an aerosol. In order to avoid repeated description, the description of the vaporizer 1 will be omitted.

Next, the battery 130 may supply power used to operate the aerosol generation device 100-1. For example, the battery 130 may supply power to allow the heating element 16 of the vaporizer 1 to heat an aerosol-generating substrate and may supply power required for the controller 120 to operate.

Also, the battery 130 may supply power required to operate electrical components such as a display (not illustrated), a sensor (not illustrated), and a motor (not illustrated) which are installed in the aerosol generation device 100-1.

Next, the controller 120 may control the overall operation of the aerosol generation device 100-1. For example, the controller 120 may control the operation of the vaporizer 1 and the battery 130 and also control the operation of other components included in the aerosol generation device 100-1. The controller 120 may control power supplied by the battery 130, a heating temperature of the heating element 16 included in the vaporizer 1, and the like. Also, the controller 120 may check a state of each component of the aerosol generation device 100-1 and determine whether the aerosol generation device 100-1 is in an operable state.

The controller 120 may be implemented by at least one processor. The processor may also be implemented with an array of a plurality of logic gates or implemented with a combination of a general-purpose microprocessor and a memory which stores a program that may be executed by the microprocessor. Also, those of ordinary skill in the art to which the present disclosure pertains should understand that the controller 120 may also be implemented with other forms of hardware.

Meanwhile, in some embodiments, the aerosol generation device 100-1 may further include an input unit (not illustrated) to receive a user input. The input unit may be implemented with a switch or a button, but the scope of the present disclosure is not limited thereto. In the present embodiment, the controller 120 may control the aerosol generation device 100-1 in response to a user input received through the input unit. For example, the controller 120 may control the aerosol generation device 100-1 to generate an aerosol as the user operates a switch or a button.

Hereinafter, the hybrid-type aerosol generation devices 100-2 and 100-3 will be briefly described with reference to FIGS. 13 and 14.

FIG. 13 illustrates the aerosol generation device 100-2 in which the vaporizer 1 and a cigarette 150 are arranged in parallel, and FIG. 14 illustrates the aerosol generation device 100-3 in which the vaporizer 1 and the cigarette 150 are arranged in series. However, the inner structures of the aerosol generation devices to which the vaporizer 1 according to an embodiment of the present disclosure is applied are not limited to those illustrated in FIGS. 13 and 14, and the arrangement of the components may be changed according to design methods.

In FIG. 13 or 14, a heater 140 may be disposed around the cigarette 150 to heat the cigarette 150. For example, the heater 140 may be an electric resistive heater but is not limited thereto. The heater 140 or a heating temperature of the heater 140 may be controlled by the controller 120. The aerosol generated by the vaporizer 1 may pass through the cigarette 150 and be inhaled into the oral region of the user.

Various types of aerosol generation devices 100-1 to 100-3 to which the vaporizer 1 according to some embodiments of the present disclosure may be applied have been described above with reference to FIGS. 12 to 14.

All the components constituting the embodiments of the present disclosure have been described above as being combined into one body or being operated in combination, but the technical idea of the present disclosure is not necessarily limited to the embodiments. That is, any one or more of the components may be selectively operated in combination within the intended scope of the present disclosure.

The embodiments of the present disclosure have been described above with reference to the accompanying drawings, but those of ordinary skill in the art to which the present disclosure pertains should understand that the present disclosure may be embodied in other specific forms without changing the technical idea or essential features thereof. Therefore, the embodiments described above should be understood as being illustrative, instead of limiting, in all aspects. The scope of the present disclosure should be interpreted by the claims below, and any technical idea within the scope equivalent to the claims should be interpreted as falling within the scope of the technical idea defined by the present disclosure.

What is claimed is:

1. A vaporizer comprising:
    a porous wick configured to absorb an aerosol-generating substrate in a liquid state through a porous body; and
    a heating element protruding from a side surface of the porous body and comprising:
        a heating pattern which has a planar form and is embedded in the porous body, and configured to heat the absorbed aerosol-generating substrate by the heating pattern to generate an aerosol;
    one or more terminals electrically connected to the heating pattern and a battery,
    wherein the one or more terminals protrude from the side surface of the porous body and are folded to come in contact with the side surface of the porous body,
    wherein a connecting member that connects the heating pattern and the one or more terminals to each other and is embedded in the porous body, and
    wherein the porous wick overlaps the heating pattern, and does not overlap the one or more terminals.

2. The vaporizer of claim 1, wherein the heating pattern is embedded at a position deviated in a specific direction from a center of the porous body.

3. The vaporizer of claim 2, further comprising a liquid reservoir configured to store the aerosol-generating substrate,
    wherein the specific direction is an opposite direction of a direction in which the liquid reservoir is disposed with respect to the porous wick.

4. The vaporizer of claim 1, wherein a depth at which the heating pattern is embedded is in a range of 0 μm to 400 μm from a surface of the porous body.

5. The vaporizer of claim 1, wherein the porous body is formed by a plurality of beads.

6. The vaporizer of claim 5, wherein the beads are ceramic beads.

7. The vaporizer of claim 5, wherein a diameter of each of the beads is in a range of 70 μm to 100 μm.

8. The vaporizer of claim 5, wherein a diameter distribution of the plurality of beads has a tolerance that is 20% of an average diameter.

9. The vaporizer of claim 1, further comprising an airflow tube disposed above the porous wick and configured to deliver the generated aerosol,
    wherein the heating pattern is embedded in a lower portion of the porous body.

* * * * *